(No Model.)
J. B. COLT.
DEVICE FOR FOCUSING LENSES.
No. 288,025. Patented Nov. 6, 1883.
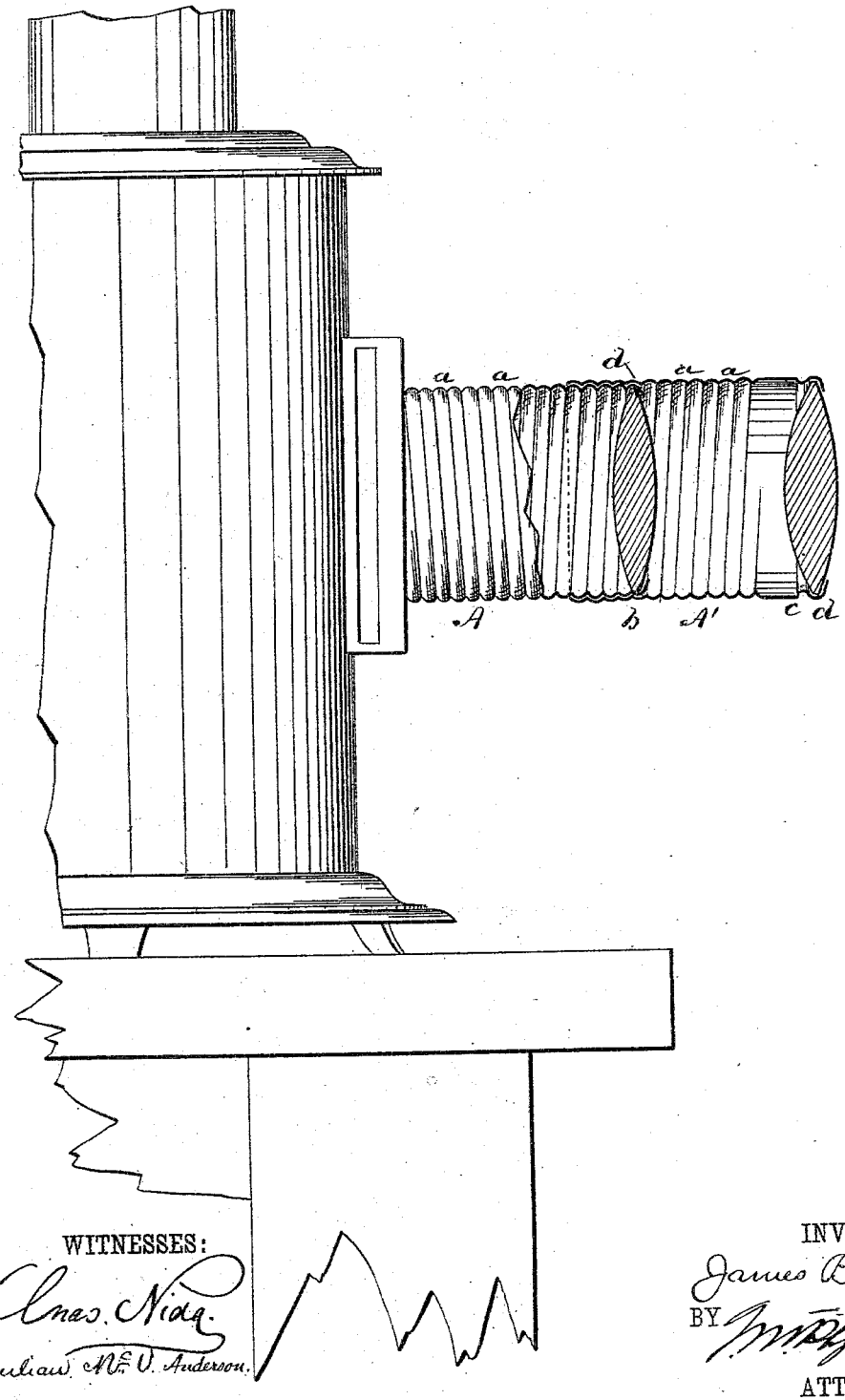
WITNESSES:
Chas. Nida.
Julian McV. Anderson.
INVENTOR
James B. Colt
BY
ATTORNEY

UNITED STATES PATENT OFFICE.

JAMES B. COLT, OF NEW YORK, N. Y., ASSIGNOR OF ONE-HALF TO SIDNEY C. THOMPSON, OF SAME PLACE.

DEVICE FOR FOCUSING LENSES.

SPECIFICATION forming part of Letters Patent No. 288,025, dated November 6, 1883.

Application filed September 17, 1883. (No model.)

*To all whom it may concern:*

Be it known that I, JAMES B. COLT, of the city, county, and State of New York, have invented a new and useful Improvement in Devices for Focusing Lenses; and I do hereby declare the following to be a full, clear, and exact description of the same, reference being had to the accompanying drawing, forming part of this specification.

This invention is in the nature of an improvement in devices for focusing lenses; and the invention consists in the focusing device hereinafter shown, described, and claimed.

In the accompanying drawing, the figure represents my invention, partly in section, applied to a magic lantern.

The focusing of lenses is always attended with more or less trouble, unless the tubes that contain the lenses are provided with a rack and pinion. Without such provision the sliding of one cylinder within another to arrive at a close adjustment of the focus is difficult, and in a measure unsatisfactory. The rack and pinion is expensive and only found applied to expensive apparatus. Now, to make a focusing device that can be easily and cheaply applied to magic lanterns, stereopticons, and similar contrivances, and also to an inexpensive grade of telescopes and opera-glasses, I strike up from a suitable blank of thin sheet metal two cylinders, A A'. These cylinders are of course formed up to any desired diameter; but the diameter of one of the cylinders, as A, for instance, is made somewhat less than the diameter of the other, A', so that one may be received within the other. After the cylinders are in this way formed screw-threads $a$ are spun or otherwise formed onto them, the screw-threads of one cylinder corresponding with the screw-threads of the other, so that the cylinder A' may be readily screwed into the cylinder A. Into the ends $b$ and $c$ of the cylinders A and A' the lenses are inserted by fitting them into suitable recesses $d$, also spun into the ends of each cylinder.

It is obvious from the foregoing description that in order to adjust the focus of the lenses in the cylinder it is simply necessary to screw one cylinder out or into the other, when the adjustment is obtained with reasonable accuracy and without trouble.

Having now described my invention, what I claim as new, and desire to secure by Letters Patent, is—

1. Lens-tubes A and A', corrugated with screw-threads $a$ spun thereon, in combination with lenses fixed into said tubes, as and for the purpose described.

2. Lens-tubes with spun corrugated screw-threads $a$ and recesses $d$, in combination with lenses fitted in said recesses, as and for the purpose described.

JAMES B. COLT.

Witnesses:
JULIAN McV. ANDERSON,
G. M. PLYMPTON.